United States Patent [19]
Wurst

[11] Patent Number: 4,606,021
[45] Date of Patent: Aug. 12, 1986

[54] DIGITAL CONFERENCE CIRCUIT
[75] Inventor: Walter K. Wurst, Wellington, Canada
[73] Assignee: ITT Corporation, New York, N.Y.
[21] Appl. No.: 641,625
[22] Filed: Aug. 17, 1984
[51] Int. Cl.[4] .......................................... H04Q 11/04
[52] U.S. Cl. ................................................... 370/62
[58] Field of Search ...................... 370/62; 179/18 BC; 381/94

[56] References Cited
U.S. PATENT DOCUMENTS

| | | | |
|---|---|---|---|
| Re. 31,651 | 8/1984 | Alles | 370/62 |
| 4,225,956 | 9/1980 | Betts et al. | 370/62 |
| 4,229,814 | 10/1980 | Betts | 370/62 |
| 4,257,120 | 3/1981 | Funderburk et al. | 370/62 |
| 4,280,216 | 7/1981 | Zeitrag | 370/62 |
| 4,387,457 | 6/1983 | Münter | 370/62 |
| 4,388,717 | 6/1983 | Burke | 370/62 |
| 4,389,720 | 6/1983 | Baxter et al. | 370/62 |
| 4,393,496 | 7/1983 | Zeiträeg | 370/62 |
| 4,449,217 | 5/1984 | Simon | 370/62 |
| 4,477,897 | 10/1984 | Lane | 370/62 |
| 4,482,998 | 11/1984 | Maroof et al. | 370/62 |
| 4,486,879 | 12/1984 | Baltz | 370/62 |
| 4,488,291 | 12/1984 | Eschmann et al. | 370/62 |
| 4,495,616 | 1/1985 | Shuh | 370/62 |
| 4,499,577 | 2/1985 | Baranyai | 370/62 |
| 4,509,166 | 4/1985 | Simon | 370/62 |

Primary Examiner—Douglas W. Olms
Assistant Examiner—Kenneth I. Rokoff
Attorney, Agent, or Firm—John T. O'Halloran; Thomas F. Meagher

[57] ABSTRACT

The disclosed digital conference circuit additively combines conference signals with a single adder, a partial sum accumulator RAM, and conversion ROMs. Internal conferencing time slots are dynamically assignable via a microprocessor controlled channel indexing memory. The signal level on lines can be selectively adjusted to compensate for loop attenuation on a per-line basis. The circuit can operate with a number of voice coding law PCM signals from CODECs by the use of conversion ROMs containing conversion tables for the selected voice coding law. Additive background noise levels may be reduced by the dynamic selection of modified sections of the conversion tables. The number of conferences available and the number of lines per conference is limited only by the number N of internal conferencing PCM time slots. The number of internal conferencing time slots used per conference equals the square of the number of lines in the conference. The total number of multi-line conferences possible at any one time is determined by determining the number of internal conferencing time slots required per multi-line conference and fitting this into the N PCM time slot total available space. Conference capacity can be increased by increasing the number of internal conferencing time slots per frame.

18 Claims, 1 Drawing Figure

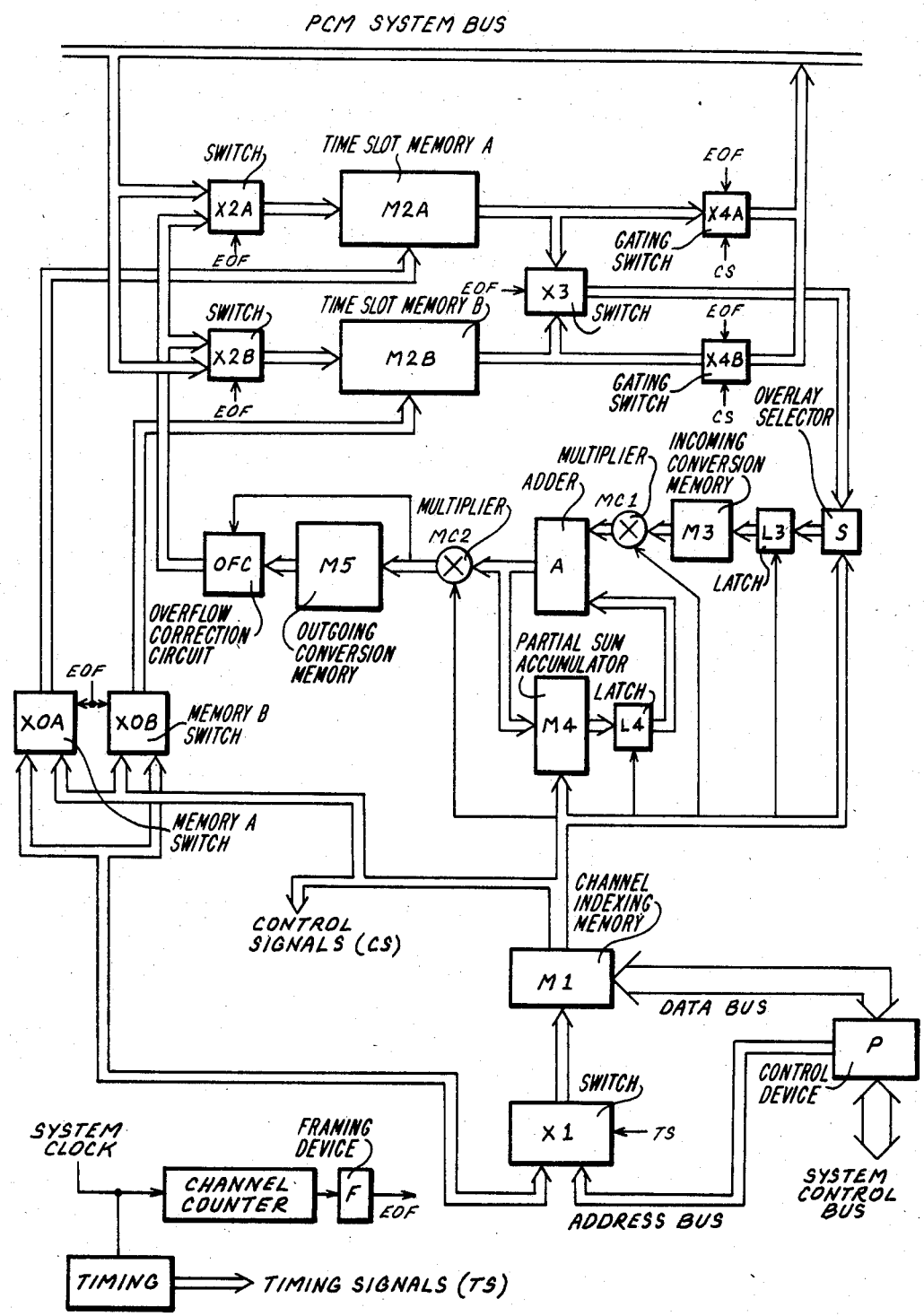

DIGITAL CONFERENCE CIRCUIT

FIELD OF THE INVENTION

This invention relates to a digital conference circuit for digital communication systems.

BACKGROUND OF THE INVENTION

Conference circuits for digital communication systems are well known in the art. Such conference circuits typically employ techniques similar to either the summing technique shown by, e.g., U.S. Pat. No. 4,416,007, to D. D. Huizinga, et al., or to the loudest speaker technique shown by, e.g., U.S. Pat. No. 3,699,264, to S. G. Pitroda, et al.

The summing technique employed by the Huizinga conferencing arrangement requires a plurality of adders, including a multiple input adder, and subtractors. A known conference circuit employing the loudest speaker technique has a digital threshold detector to determine the presence of the loudest speaker. Such a circuit is shown, e.g., by commonly assigned copending U.S. patent application Ser. No. 427,970 filed Sept. 29, 1982 of B. D. Shuh, entitled "PCM Conference Circuit" and incorporated herein by reference. The conference circuit then connects this source to all other lines in the conference while at the same time deleting the signal to the line determined to be the source of the loudest speaker. The main difficulty with this circuit relates to the operation of the loudest speaker threshold detector. The circuit operates in a satisfactory manner when the background noise on all lines in the conference is low and the levels are equal. However, when the noise level on one or more lines increases, one line can dominate others, especially if some of the lines are low level trunk circuits. Also, the detector may switch between noisy lines producing an annoying chopping effect. The circuit is also limited in the total number of multi-line conferences which can be provided simultaneously.

SUMMARY OF THE INVENTION

The disclosed digital conference circuit additively combines conference signals with a single adder, a partial sum accumulator random-access memory (RAM), and conversion read-only memories (ROMs). The threshold detection function is eliminated. Additive background noise levels may be reduced by the dynamic selection of modified sections of conversion tables in the conversion ROMs. The number of conferences, and the number of lines per conference, are not arbitrarily restricted, but instead are flexibly accommodated on a demand basis. Internal conferencing time slots are dynamically assignable via a microprocessor controlled channel indexing memory. The signal level on lines, such as trunk circuits, can be selectively adjusted to compensate for loop attenuation on a per-line basis resulting in more balanced levels on conferenced conversations.

Digital techniques are used permitting a high level of integration, using pulse-code modulated (PCM) signals from standard coder-decoders (CODECs). The circuit can operate with a number of voice coding law signals, such as u-law and A-law, by the use of conversion ROMs containing conversion tables for the selected voice coding law.

The number of conference available and the number of lines per conference is limited only by the number N of internal conferencing PCM time slots. The number of internal conferencing time slots used per conference equals the square of the number of lines in the conference. The total number of multi-line conferences possible at any one time is determined by determining the number of internal conferencing time slots required per multi-line conference and fitting this into the N time slot total available space. These time slots are internal to the conference circuit and have no effect on the capacity of the System PCM Bus. Conference capacity can be increased by increasing the number of internal conferencing time slots per frame.

BRIEF DESCRIPTION OF THE DRAWING

The principles of the invention will be more fully appreciated from the illustrative embodiment in the accompanying drawing. The single FIGURE shows a block diagram of the invention.

DETAILED DESCRIPTION

By way of example, the invention is described with reference to a time-division multiplex digital communication system which uses the North American and Japanese standard time slot frame of 24 voice channels. This standard frame results from digitizing speech at an 8 kHz rate, which results in a 125 microsecond frame, and employing the T1 data rate of 1.544 megabits per second. Thus, there are 193-bits in each 125 microsecond frame. Twenty-four 8-bit words, each representing one sample of each of the channels, constitute 192-bits of a 193-bit frame with the 193d-bit being a framing bit. Groups of voice channels, each having 24 voice channels, are coupled to a 193 time slot by 8-bit System PCM Bus having a frame length equal to the standard frame length. Each group frame is disassembled into the original 24 8-bit signals, each of which occupies an 8-bit time slot of the System PCM Bus.

As shown in the FIGURE, line signals in PCM time slots assigned to conference activity, which are incoming from a 193 time slot by 8-bit System PCM Bus, are loaded into a 193-bit by 8-bit time slot buffer RAM M2 during a frame. During the same fram, M2 also outputs the resultant conference information, from the frame preceding the incoming frame by two frames, onto the outgoing PCM time slots. The incoming channels are accumulated for one frame and processed during the next frame, with the result being inserted on the System PCM Bus in the following frame. M2 is duplicated as two RAMs M2A and M2B to extract/insert information, and to collect processed information, on alternate frames in an interleaved manner so as to produce a continuous signal frame-to-frame. During the extraction/insertion mode, M2 is coupled to the Channel Counter which leads the time slot position by ½ time slot period. This is accomplished through the use of conference timing signals which are each offset from the time slot by a fraction of the time slot period. This allows information to be either inserted onto or extracted from the time slot associated with the M2 address location assigned to the time slot channel in the correct center-sampled position. Channel Indexing RAM M1, controlled, e.g., by an on-board microprocessor, determines if the time slot is incoming or outgoing, this function being controlled by control bits of the M1 output signal, e.g., bits 17 and 18 of a 20-bit output signal. M1 includes an output latch. Switches XOA and XOB allow for addressing M2A and M2B, respectively, by either M1 or the Channel Counter, respectively.

During a conference, the assigned line PCM signals are processed by being digitally added together to produce a composite signal that is sent to all lines. The composite signal does not include as a component the signal of the line to which the composite signal is being sent, thus eliminating speaker side tone. For each conference, the number of additions required is equal to the number of lines per conference. The number of internal conferencing time slots required per addition is equal to the number of lines. Thus, the total number of conferencing time slots required per conference equals the square of the number of lines per conference.

The number of conferences available and the number of lines per conference is limited only by the number N of internal conferencing PCM time slots. The internal conference PCM time slot frame has the same length as the System PCM Bus time slot frame. The total number of multi-line conferences possible at any one time is determined by determining the number of time slots required per multi-line conference and fitting this into the N time slot total available space. These time slots are internal to the conference circuit and have no effect on the capacity of the System PCM Bus. For example, where the number of internal conferencing time slots is matched to the number of time slots in the System PCM Bus, which here would be equal to 192 with an additional framing time slot, the maximum number of multi-line conferences are as follows:

| Lines per Conference | Time slots per Conference | Maximum Number of Conferences | Used Time Slots | Remaining Time Slots |
|---|---|---|---|---|
| 3 | 9 | 21 | 189 | 3 |
| 4 | 16 | 12 | 192 | 0 |
| 5 | 25 | 7 | 175 | 17 |
| 6 | 36 | 5 | 180 | 12 |
| 7 | 49 | 3 | 147 | 45 |
| 8 | 64 | 3 | 192 | 0 |
| 9 | 81 | 2 | 162 | 30 |
| 10 | 100 | 1 | 100 | 92 |
| 11 | 121 | 1 | 121 | 71 |
| 12 | 144 | 1 | 144 | 48 |
| 13 | 169 | 1 | 169 | 23 |

Many multi-line conference combinations are possible. For example, a twelve-line conference, a five-line conference, and two three-line conferences could all be provided at the same time.

Conversion of the conference line signals to and from linear form is done via two conversion ROMs. Incoming 8-bit PCM signals from each conference line, via standard 8-bit u-law CODECs, are first converted from an 8-bit u-law companded PCM signal, consisting of a 7-bit value plus a sign bit, to a 12-bit 2s compliment linear signal, corresponding to the 7-bit value plus sign bit, in a 256-bit by 12-bit programmable read-only memory (PROM) M3 which contains a conversion table. The linear PCM signal is added, by a 16-bit adder A, to the result of any previous addition which is contained in an indexed 64-bit by 16-bit partial sum accumulator RAM M4. Because the result contains the value as well as the sign, addition or subtraction is done in adder A by simple 2s compliment arithmetic. A 16-bit adder is used to provide the required resolution for the 12-bit 2s compliment linear addition. The additional bits are used to determine an overflow in the positive or negative directions. The index corresponds to the line for which the addition is being done. The capacity of M4 is limited to 64, in the example given, because no more than 63 lines may be involved in conference activity at any one time, which is in the event of twenty-one 3 line conferences.

The result of the addition by the 16-bit adder is stored in M4 as an intermediate result, at the same time being converted from 12-bit linear to 8-bit u-law by a conversion table contained in an 4-kilobit by 8-bit read-only memory M5 eg. an EPROM. The output of M5 goes through an overflow correction circuit OFC which prevents high amplitude wrap-around distortion on loud combined signals. As stated previously, additional bits of the adder A are used to determine an overflow in the positive or negative directions. For example, 00 and 11 would be the normal states of the 14th and 13th bits for the plus and minus conditions, respectively. Plus and minus adder overflow would be detected by monitoring these bits for either a 01 or a 10, respectively. When an overflow condition exists, a maximum value u-law code, having the appropriate polarity of the sign bit, is substituted by the OFC for the conversion table output. Thus, the OFC prevents excessive distortion when the addition range is exceeded during the summation of simultaneous high amplitude signals.

The OFC output signal is stored in M2 which is indexed to the correct time slot, being overwritten during every addition. The value in M2 at the end of the frame is the required u-law sum.

The sequence of operation for each conference, requiring one internal conferencing time slot per operation, is as follows:

(a) Assign a partial sum accumulator memory address location from M4 to each line and set these accumulator memory address locations to zero. This is accomplished because, by resetting the latches L3 and L4 to zero, zero is added to zero and stored in each accumulator memory address location. Two bits of the M1 output signal, e.g., bits 19 and 20, are used to reset L3 and L4, respectively.

(b) For each accumulator memory address location, select all lines in the conference except the line assigned to the specific accumulator memory address location, add each line signal to the contents of the accumulator memory address location in turn and store in the accumulator memory address location, updating the contents of the accumulator memory address location everytime an addition is done, and at the same time storing the resulting u-law value in assigned line locations in M2.

When the above process is completed for every accumulator memory address location at the end of the frame, M2 will contain the u-law resultant signal for each line in positions assigned by Indexing RAM M1. These signals are inserted, via the controlled Indexing RAM M1, in the correct time slots on the System PCM Bus during the following frame.

Switches X2A and X2B allow M2A and M2B, respectively, to collect unprocessed conference signals from the System PCM Bus or to collect processed conference signals from the conference processing portion of the conference circuit. Switch X3 allows for outputting to the conference processing portion of the conference circuit from either M2A or M2B. Framing device F provides an end-of-frame signal EOF which is used to switch X0A and X0B, X2A and X2B, and X3 so that processing and insertion/extraction can occur at the same time. Gating switches X4A and X4B allow for the controlled insertion of the resultant conference signals onto the System PCM Bus from M2A and M2B, respectively. X4A and X4B are controlled by both a control bit of the M1 output signal, e.g., bit 18, and the end-of-frame signal EOF.

In order to facilitate an increase or decrease of the number of lines during a conference call, accumulator memory address locations are assigned and zeroed on a demand basis starting at internal conference time slot one. The additions are assigned to be performed during time slots located at the end of the internal conferencing time slot frame, with these time slot assignments decreasing in time order as more lines are added. Controlled Indexing RAM M1 provides the assignment by controlling the addressing of M2. In this manner, the size of conferences may be randomly changed and new conferences of varying sizes may be added or deleted without affecting other conference calls. A control device P, such as an on-board microprocessor, is used by Indexing RAM M1 to control conferencing time slot assignments. Switch X1 allows for addressing M1 by either the control device P or the Channel Counter. X1 is controlled by the conference timing signals.

Background noise is reduced during the addition of signals from multiple conferenced lines by selecting modified u-law to linear conversion tables stored as overlayed sections in M3. Different overlays of the low-level portion of the u-law curve reduce the additive effect of background noise, with different overlays being available for different size conference configurations. In this manner, noise reduction factors are selected on a per-conference basis and may be dynamically changed as the number of calls in a conference change. Alternate overlays may be made available to M3, with one providing the normal u-law curve and others providing curves adjusted to provide different amounts of low-level additive noise reduction while also minimizing the resulting signal distortion. As an example, doubling the size of M3, from 256-bit by 12-bit to 512-bit by 12-bit, would allow for the provision of four 64-bit low-level portion alternate overlays. Selection is made by an overlay selection device S, which has a transfer function which is controlled by an overlay selection portion of the M1 output signal. Selector S modifies the line signal from M2 so that the S output is the address of the selected overlay section of M3.

Two multiplier circuits MC1 and MC2 are used to adjust the level of low-level signals, such as low-level trunk signals. The levels on these low level signal lines may be increased or decreased by, e.g., +12, +6, −6, or −12 dB, using, e.g., simplified barrel shifter circuits. The signal level is controlled on a per-line basis via control bits of the output signal of Indexing RAM M1, permitting gain to be selectively adjusted as required. In this manner, the level on trunk circuits may be increased to a level similar to that produced by local station circuits, permitting more balanced levels on signals that come from sources that have different loop attenuations. MC1 and MC2 are employed to modify the gain of selected components of the conference signal, and to modify the overall gain of selected resultant conference signals, respectively.

The circuit can be easily modified to operate with A-law signals by substituting conversion ROMs containing A-law conversion tables. Other voice coding law can be accommodated in the same manner.

Conference capacity can be increased by increasing the number of internal conferencing time slots per frame, for example, by employing the European standard time slot frame which has 25 percent more time slots per 125 microsecond frame than the North American/Japanese standard. As a further example, if the number of internal conferencing time slots were, e.g., doubled, here to 384 time slots, a nineteen-line conference, and two three-line conferences could all be provided at the same time. Conference capacity could also be increased by providing for other means for accumulation which would allow for the simultaneous zeroing of all accumulator memory address locations. This would free conferencing time slots, which were being used for zeroing, to be used for additional conference additions.

While the present invention has been described in connection with a preferred embodiment thereof, it is to be understood that additional embodiments, modifications and applications which will become obvious to those skilled in the art are included within the spirit and scope of the invention as set forth by the claims appended hereto.

I claim:

1. A conference circuit for a communication system comprising:
    means for combining conference signals, and
    means, coupled to said combining means, for reducing additive background noise portions of said conference signals, wherein said reducing means comprises a logic device containing a conversion table having a plurality of overlayed modified sections.

2. A conference circuit according to claim 1, further comprising:
    means, coupled to said reducing means, for dynamically controlling selection of said conversion table sections.

3. A conference circuit according to claim 1, further comprising:
    means, coupled to said combining means, for selectively adjusting the signal level of each of said conference signals.

4. A conference circuit according to claim 3, wherein said selective adjusting means comprises a barrel shifter circuit.

5. A conference circuit according to claim 1, further comprising:
    means, coupled to said combining means, for assigning said conference signals to internal conferencing time slots.

6. A conference circuit according to claim 5 wherein said assigning means comprises:
    indexing means for assigning said conference signals to said time slots, and
    control means, coupled to said indexing means, for dynamically controlling said indexing means.

7. A conference circuit according to claim 6, wherein said indexing means comprises a random-access memory and said control means comprises a microprocessor.

8. A conference circuit according to claim 1, wherein said conference signals comprise voice coding law encoded signals.

9. A conference circuit according to claim 8, further comprising:
    first conversion means, coupled to an input of said combining means, for converting said encoded conference signals to linear form prior to said combining, and
    second conversion means, coupled to the output of said combining means, for converting said linear conference signals to said encoded form subsequent to said combining.

10. A conference circuit according to claim 9, wherein each of said conversion means comprises a memory element containing a conversion table for said voice coding law.

11. A conference circuit according to claim 10, wherein said first conversion means comprises a programmable read-only memory and said second conversion means comprises an erasable programmable read-only memory.

12. A conference circuit according to claim 1, further comprising:
means, coupled to said combining means, for loading said conference signals from a data bus of said system prior to said combining, and for unloading said combined conference signals onto said data bus subsequent to said combining.

13. A conference circuit according to claim 12, wherein said loading means comprises duplicated memory elements.

14. A conference circuit according to claim 13, wherein each of said memory elements comprises a random-access memory.

15. A conference circuit according to claim 1, wherein said combining means comprises:
means for accumulating a partial sum of said signals, and
means, coupled to said accumulating means, for summing each unaccumulated signal of said signals with said accumulated partial sum of said signals.

16. A conference circuit according to claim 15, wherein said summing means comprises a single 2s compliment adder.

17. A conference circuit according to claim 1, further comprising:
means, coupled to said combining means, for correcting overflow of the output of said combining means.

18. A conference circuit for a communication system comprising:
means for reducing additive background noise portions of conference signals of said system, and
means, coupled to said reducing means, for dynamically controlling said reducing means, wherein said reducing means comprises a memory element containing a conversion table having a selectable plurality of overlayed modified sections.

* * * * *